(No Model.)

E. THOMSON.
DETECTOR FOR ELECTRIC CURRENT METERS.

No. 508,660.                           Patented Nov. 14, 1893.

WITNESSES:

INVENTOR

Elihu Thomson

BY

ATTORNEYS.

UNITED STATES PATENT OFFICE.

ELIHU THOMSON, OF SWAMPSCOTT, MASSACHUSETTS, ASSIGNOR TO THE GENERAL ELECTRIC COMPANY, OF NEW YORK.

DETECTOR FOR ELECTRIC-CURRENT METERS.

SPECIFICATION forming part of Letters Patent No. 508,660, dated November 14, 1893.

Application filed November 25, 1892. Serial No. 453,048. (No model.)

*To all whom it may concern:*

Be it known that I, ELIHU THOMSON, a citizen of the United States, residing at Swampscott, county of Essex, State of Massachusetts, have invented a certain new and useful Improvement in Detectors for Electric-Current Meters, of which the following is a specification.

My invention relates to devices for detecting attempts to tamper with a meter for measuring the quantity of current supplied to a circuit containing translating devices, such as the lighting circuit in a dwelling or shop. Unscrupulous persons sometimes try to "beat" the meter by connecting a shunt wire around it. This invention aims to detect any such meddling with the line, and it also provides for cutting out the electric lighting circuit, if desired.

The invention consists in a magnetic core around which the two line wires are wound in reverse directions, so that their magnetizing effects neutralize or balance each other. Adjacent to the core is a detecting device adapted to respond to a disturbance of the balance between the two coils.

Figure 1:
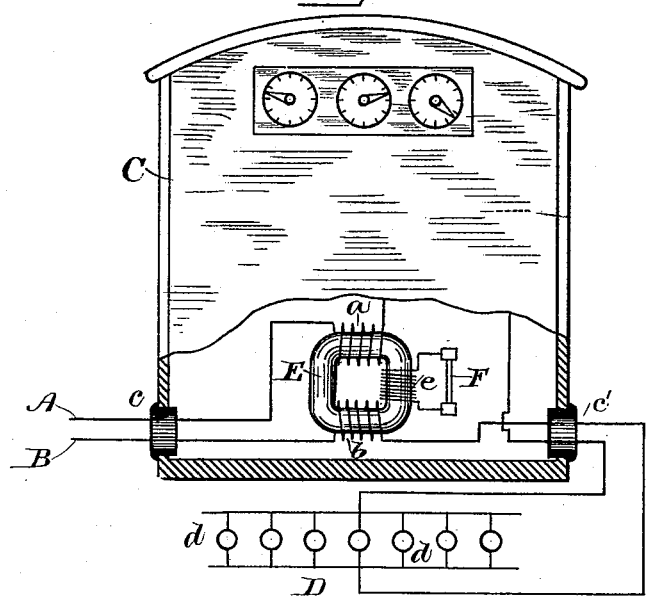
Figure 2:
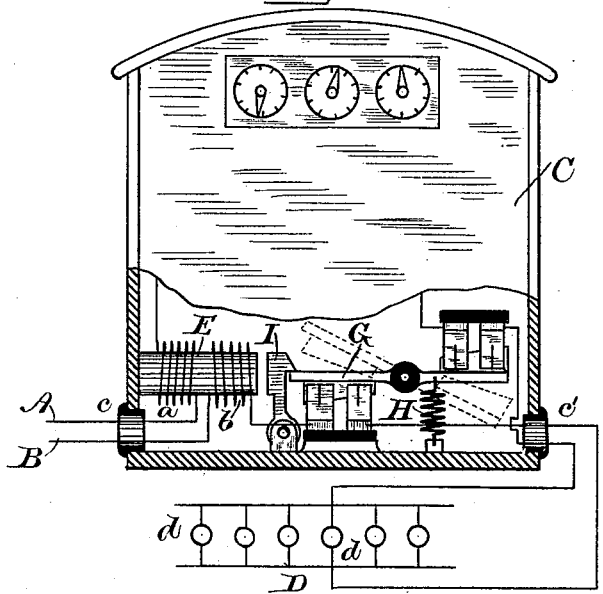

In the drawings, Figure 1 shows a detector which gives to the person tampering with the meter, no indication that it has acted, and Fig. 2 shows a device which cuts out the lighting circuit upon any attempt to shunt the meter.

The line wires A, B enter the meter casing C at $c$ and leave it at $c'$, whence they pass to the circuit D containing the lights $d$, or other translating device, or devices. Inside the meter casing is an iron core E around which the line wires are wound in reverse direction, forming the coils $a$, $b$, whose effect is to balance each other. Whenever a person attempts to shunt the meter he does it by attaching a wire to one of the mains A or B where it enters the meter and carrying it across to the corresponding main on the other side of the casing. This would result in cutting out one of the coils $a, b$, leaving the other to exert its full magnetizing effect upon the core.

In Fig. 1 there is a third coil $e$ wound on the core, the terminals of which are connected by a fuse F. Upon disturbing the balance of the coils $a$, $b$, the device becomes a transformer, of which the coil $e$ is the secondary, and the current induced therein melts the fuse. When the meter is inspected, the melted fuse is a sure indication that some one has tampered with the apparatus.

In Fig. 2, the line circuit is carried through a switch G, preferably a double pole switch, as shown. The switch is held closed preferably against the tension of a spring H, by means of a pivoted hook I forming an armature for the core E. When the balance of the coils $a$, $b$ is disturbed, as by an attempt to shunt the meter, the armature is attracted, releasing the switch and allowing it to open. This cuts out the lighting circuit, and necessitates calling in an employé of the electric service company to reset the detector.

Many other modifications of this invention may be devised, and I do not limit myself to those shown and described, the invention being broadly a detector for a current meter.

What I claim as new, and desire to secure by Letters Patent, is—

1. An electric current meter provided with an electro-magnetic device controlled by the main line current and adapted to operate when the meter is shunted, substantially as set forth.

2. An electric current meter provided with an electro-magnetic device controlled by the main line current and in series with the meter and adapted to respond to an attempt to shunt the meter, substantially as set forth.

3. An electric current meter provided with a detector comprising a magnetizable core on which the line wires are wound in reverse coils, and a device responsive to any disturbance of the balance between said coils, substantially as set forth.

4. An electric current meter provided with a detector comprising a magnetizable core on which the line wires are wound in reverse coils, and a circuit controlling device responsive to any disturbance of the balance between said coils, substantially as described.

5. An electric current meter provided with a magnetizable core on which the line wires are wound in reverse coils, and a device controlling the line circuit and responsive to any disturbance in the balance between said coils, substantially as described.

In witness whereof I have hereto set my hand this 23d day of November, 1892.

ELIHU THOMSON.

Witnesses:
JOHN W. GIBBONEY,
BENJAMIN B. HULL.